(12) United States Patent
Kruse

(10) Patent No.: US 10,481,412 B2
(45) Date of Patent: *Nov. 19, 2019

(54) EYEWEAR ARTICLE WITH CHANGEABLE TEMPLES

(71) Applicant: Torsten Kruse, Naples, FL (US)

(72) Inventor: Torsten Kruse, Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/293,068

(22) Filed: Mar. 5, 2019

(65) Prior Publication Data

US 2019/0196219 A1 Jun. 27, 2019

Related U.S. Application Data

(63) Continuation-in-part of application No. 15/798,328, filed on Oct. 30, 2017, now Pat. No. 10,222,630.

(60) Provisional application No. 62/509,017, filed on May 19, 2017.

(51) Int. Cl.
| | |
|---|---|
| *G02C 1/00* | (2006.01) |
| *G02C 5/14* | (2006.01) |
| *G02C 5/00* | (2006.01) |
| *G02C 1/04* | (2006.01) |
| *G02C 5/22* | (2006.01) |

(52) U.S. Cl.
CPC ............... *G02C 5/14* (2013.01); *G02C 1/04* (2013.01); *G02C 5/008* (2013.01); *G02C 5/2209* (2013.01); *G02C 2200/08* (2013.01)

(58) Field of Classification Search
CPC ..... G02C 5/2272; G02C 2200/16; G02C 5/22
USPC ......... 351/41, 153; 424/427; 134/26; 521/55
See application file for complete search history.

(56) References Cited

U.S. PATENT DOCUMENTS 10,222,630 B2 * 3/2019 Kruse ..................... G02C 1/10

* cited by examiner

*Primary Examiner* — Hung X Dang
(74) *Attorney, Agent, or Firm* — Mark Terry

(57) ABSTRACT

A one-piece, composite eyewear article including a frame having two temples, a top bar and two hinges, the entire frame composed of a single integral piece of solidified thermoplastic consisting of a polymer, a lens situated against, and extending across, the top bar, the lens composed of a single integral piece of optical grade cured liquid silicone rubber consisting of a dimethyl polysiloxane polymer thermoset, and wherein the frame and lens are molded via a two-material molding process, such that the lens auto-adheres to the frame during curing.

20 Claims, 12 Drawing Sheets

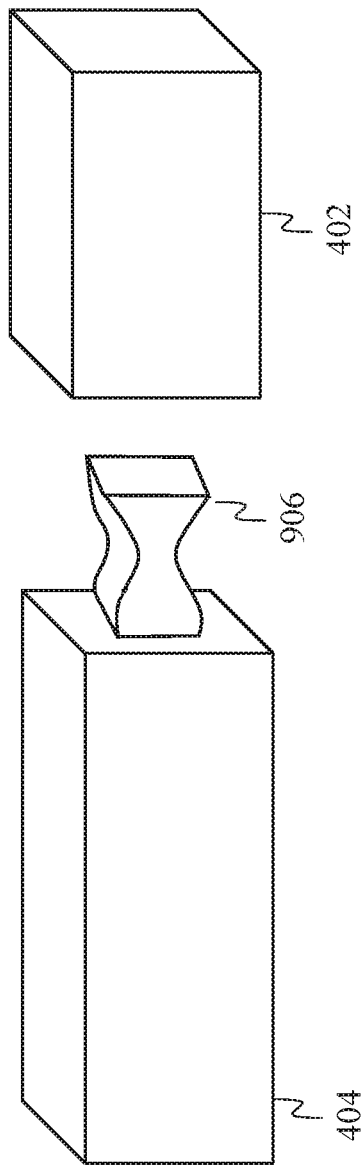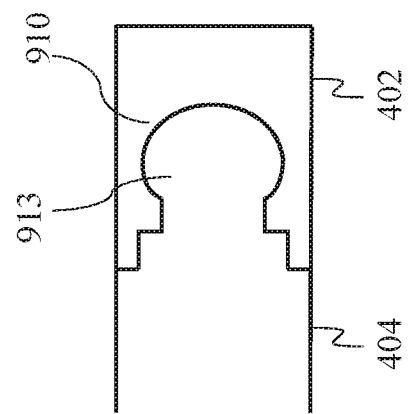
FIG. 9A
FIG. 9B

EYEWEAR ARTICLE WITH CHANGEABLE TEMPLES

CROSS-REFERENCE TO RELATED APPLICATIONS

This application is a continuation in part of, and claims priority to, utility application Ser. No. 15/798,328 filed Oct. 30, 2017, now U.S. Pat. No. 10,222,630 and titled "One Piece Eyewear Article", which claims priority to provisional application 62/509,017 filed May 19, 2017 and titled "One Piece Eyewear Article." The subject matter of provisional application 62/509,017 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to the field of eyewear and, more specifically, relates to eyewear manufactured using novel processes and materials.

BACKGROUND

Eyewear consists of items and accessories worn on or over the eyes, for fashion or adornment, protection against the environment, and to improve or enhance visual acuity. Common forms of eyewear include glasses (also called eyeglasses or spectacles), sunglasses, and the like. Eyewear can also include more utilitarian forms of eye protection, such as goggles. A standard eyewear article comprises a single lens or two lenses, a frame, and two temples. The temples are the arms that are placed over a wearer's ears and the hinges rotationally attach the frame to the temples.

One of the drawbacks associated with the conventional process for manufacturing eyewear is the large amount of manpower, tooling and fabrication involved. The conventional process for manufacturing eyewear typically involves the following. The temples are manufactured, often using an injection molding process or a metal stamping process. The frame is separately manufactured, also using an injection molding process or a metal stamping process. Then, the hinges are attached to the frame and temples, often using manpower, machining or some combination of the two. Lastly, the lens or lenses are attached to the frame, also often using manpower, machining or some combination of the two. Thus, there is a significant number and variation of steps involved in the conventional process for manufacturing eyewear. This can be costly, time consuming and tedious for manufacturers of eyewear.

Furthermore, conventional eyewear suffers certain drawbacks related to its constitution and its usage. Conventional eyewear is often made of standard, smooth plastic which has a tendency of slipping off a user's nose, especially when the user is sweating or has natural oils on his face. Also, conventional eyewear is known to scratch and break easily, as it is typically made of plastic and glass. Further, conventional eyewear is not known to be highly resistant to heat or cold, which limits its usability among individuals who require eyewear in their occupations, such as welders. Lastly, purchasers of conventional eyewear are stuck with the color and design of the purchased eyewear, which limits the versatility of its use for fashion purposes.

Therefore, a need exists to overcome the problems with the prior art as discussed above, and particularly for improved eyewear and a more efficient way of manufacturing said improved eyewear.

SUMMARY

A composite eyewear article is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, an article is provided that solves the above-described problems. A one-piece, composite eyewear article includes a frame having two temples, a top bar and two hinges, the entire frame composed of a single integral piece of solidified thermoplastic consisting of a polymer, a lens situated against, and extending across, the top bar, the lens composed of a single integral piece of optical grade cured liquid silicone rubber consisting of a dimethyl polysiloxane polymer thermoset, and wherein the frame and lens are molded via a two-material molding process, such that the lens auto-adheres to the frame during curing.

In another embodiment, a composite eyewear article includes an eyewear frame comprising of two temple stubs, a top bar, a nosepiece and two hinges, the entire frame composed of a single integral piece of solidified thermoplastic consisting of a polymer, a lens situated against, and extending across, the top bar, the lens composed of a single integral piece of optical grade cured liquid silicone rubber consisting of a dimethyl polysiloxane polymer thermoset, wherein the frame and lens are molded via a two-material molding process, such that the lens auto-adheres to the frame during curing, and a pair of separately molded temple arms configured for removable coupling with the two temple stubs.

In another embodiment, a one-piece, composite eyewear article is prepared by a process comprising the steps of: providing a mold having a first void defining an eyewear frame comprising of two temple stubs, a top bar and two hinges, and a second void defining a lens situated against the top bar and extending across the top bar, injecting the first void in the mold with a thermoplastic consisting of a liquid polymer, so as to produce said frame as a single integral piece, injecting the second void in the mold with optical grade silicone rubber consisting of a liquid dimethyl polysiloxane polymer thermoset, so as to produce said lens as a single integral piece, allowing a predefined period of time to pass, wherein during said period of time, the lens auto-adheres to the frame during curing, and removing the one-piece, composite eyewear article from the mold.

In another embodiment, a composite eyewear article includes an eyewear frame comprising of two temple stubs, a top bar, a nosepiece and two hinges, the entire frame composed of a single integral piece of cured liquid silicone rubber consisting of a dimethyl polysiloxane polymer thermoset, a lens situated against, and extending across, the top bar, the lens composed of a single integral piece of optical grade cured liquid silicone rubber consisting of a dimethyl polysiloxane polymer thermoset, wherein the frame and lens are molded via a two-material molding process, such that the lens auto-adheres to the frame during curing, and a pair of temple arms configured for removable coupling with the two temple stubs, each temple arm composed of a single integral piece of solidified thermoplastic consisting of a polymer.

BRIEF DESCRIPTION OF THE DRAWINGS

The accompanying drawings, which are incorporated in and constitute a part of this disclosure, illustrate various example embodiments. In the drawings:

FIG. 9A depicts a temple stub and temple arm of a composite eyewear article, according to an example embodiment;

FIG. 9B depicts a cross sectional view of another temple stub and temple arm of a composite eyewear article, according to an example embodiment;

DETAILED DESCRIPTION

Figure 1:
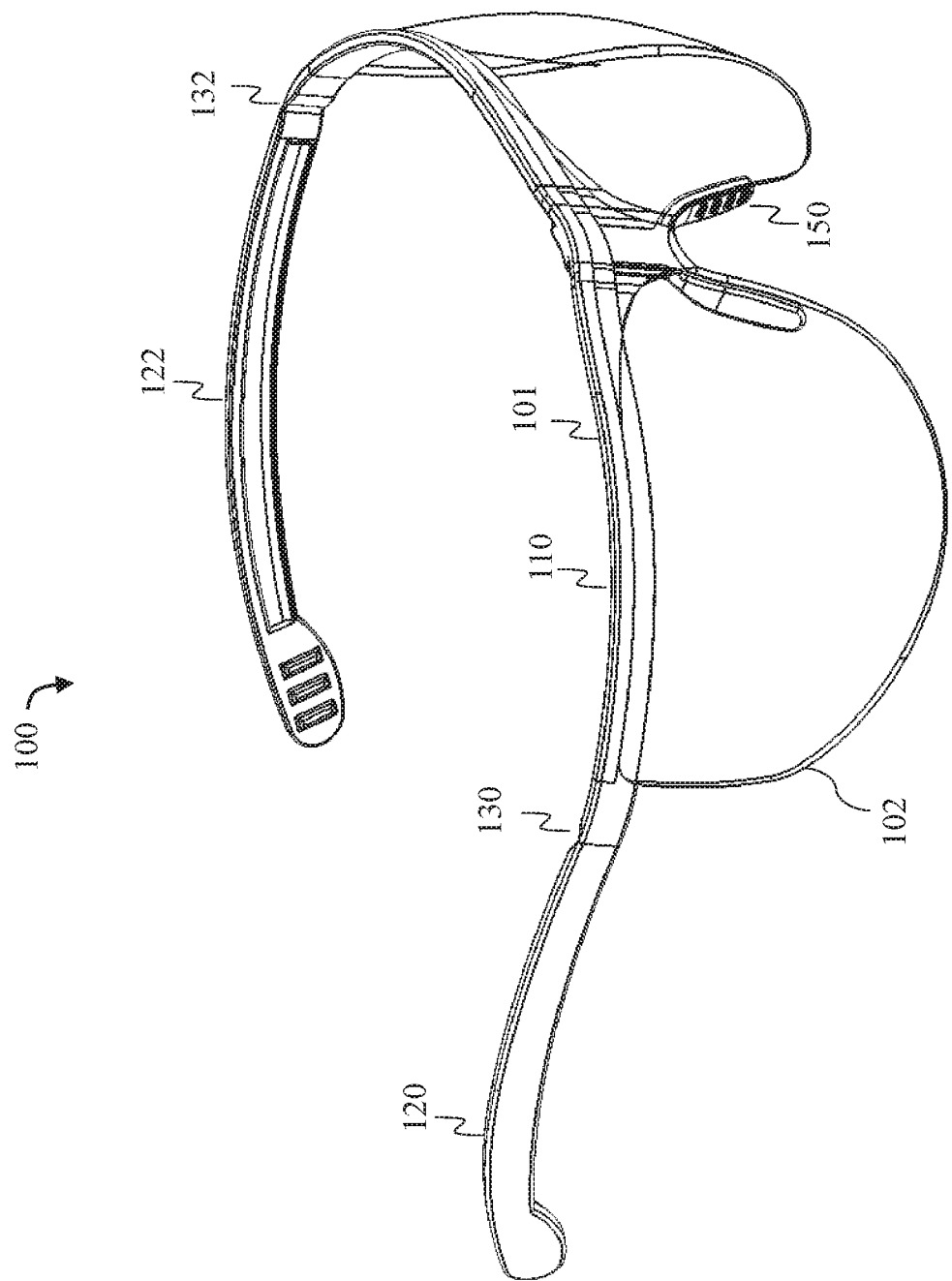
FIG. 1 depicts a front perspective view of a one-piece, composite eyewear article, according to an example embodiment.

The following detailed description refers to the accompanying drawings. While embodiments of the claimed subject matter may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing a one-piece, composite eyewear article that is manufactured using a reduced number of passes in the manufacturing process. The claimed subject matter presents an inexpensively manufactured article that provide high quality eye protection, resists impact and can be immersed in water. The claimed subject matter accomplishes the objectives of conventional eyewear while also reducing manufacturing costs and providing utility to the consumer. Additionally, the material of the claimed subject matter reduces slipping of the eyewear off a user's nose, especially when the user is sweating or has natural oils on his face and reduces or eliminates scratching and breaking of the frame and lens(es). Further, the material of the claimed subject matter is highly resistant to heat and cold, which increases usability among individuals who require eyewear in their occupations, such as welders and athletes. Lastly, purchasers of the claimed subject matter are not stuck with the color and design of the purchased eyewear, since interchangeable temples allow the user to change the color and design of the eyewear for fashion purposes, which increases the versatility of the claimed subject matter's use for fashion purposes.

Eyewear or eyeglasses are worn on or over the eyes, for fashion or adornment, protection against the environment, and to improve or enhance visual acuity. Eyewear consists of a lens or lenses mounted in a frame that holds them in front of a person's eyes, using a bridge over the nose and temples or arms which rest over the ears. Eyewear is typically used for vision correction, such as with reading glasses and glasses used for nearsightedness, for safety in providing eye protection against flying debris or radiation, for glare or bright daylight, for high levels of ultraviolet light, for viewing specific visual information (such as stereoscopy) or three-dimensional movies, or simply for aesthetic or fashion purposes.

Many eyewear articles include one or more of the following known elements: a top bar or brow bar (a bar just above the lens providing structural support and/or style enhancement), two nose pads that allow a comfortable resting of the frame on the nose, two hinges connecting the top bar to the temples and allowing a swivel movement, two temples (or earpieces) on either side of the skull, and two temple tips at the end of each temple.

FIG. 1 depicts a front perspective view of a one-piece, composite eyewear article 100, according to an example embodiment. FIG. 1 shows that the one-piece, composite eyewear article 100 includes a frame 101 comprising of temples 120, 122, top bar 110, nose piece 150 and hinges 130, 132, the frame 101 composed of a single integral piece of solidified thermoplastic consisting of a polymer. A thermoplastic, or thermosoftening plastic, is a plastic polymer material that becomes pliable or moldable at a certain elevated temperature and solidifies upon cooling. Thermoplastic has high stability and ability to resist extreme temperatures of heat and cold, ideally suitable for production of parts, where high quality is desired. Thermoplastic is also resistant to breaking, cracking and scratching. Thermoplastic also reduces slippage when placed against human skin, even when the skin is wet or oily.

The top bar 110 is an elongated piece that extends horizontally a long a top of the article 100. The top bar 110 is curved to match the curve of the wearer's forehead. A nosepiece 150 is coupled to a midpoint of the top bar, wherein the nosepiece comprises a planar piece 302 extending downwards from the top bar, and a pair of nose-pads 304 coupled to the planar piece.

FIG. 1 shows that the one-piece, composite eyewear article 100 includes a lens 102 located below the top bar 110, the lens composed of optical grade cured liquid silicone rubber consisting of a dimethyl polysiloxane polymer thermoset. Optical-grade silicones offer high temperature resistance along with optical clarity. Optical liquid silicone rubber does not discolor or lose transparency with age or with exposure to heat or UV light; it is significantly lighter than glass and most other plastics; and it is scratch and crack resistant, among many other advantages. The lens 102 (or a top portion thereof) contacts, and is coupled with, the forward-facing surface of the top bar 110. The lens 102 (or a top portion thereof) auto-adheres to the forward-facing surface of the top bar 110 during curing. The lens 102 (or a top portion thereof) also contacts, and is coupled with, the forward-facing surfaces of the planar piece 302 and pair of nose-pads 304 of the nosepiece 150. The lens 102 (or a top portion thereof) auto-adheres to the forward-facing surfaces of the planar piece 302 and pair of nose-pads 304 of the nosepiece 150 during curing.

FIG. 1 shows that the right temple 120 is attached via right hinge 130 to the top bar 110, and the top bar 110 is connected to the nosepiece 150. The left hinge 132 is connected to the left temple 122. Each temple may bend down behind the ears, follow the contour of the skull and rest evenly against the skull.

In an alternative embodiment, the frame 101 comprising of temples 120, 122, top bar 110, nose piece 150 and hinges 130, 132, is also composed of cured liquid silicone rubber consisting of a dimethyl polysiloxane polymer thermoset.

Figure 2:
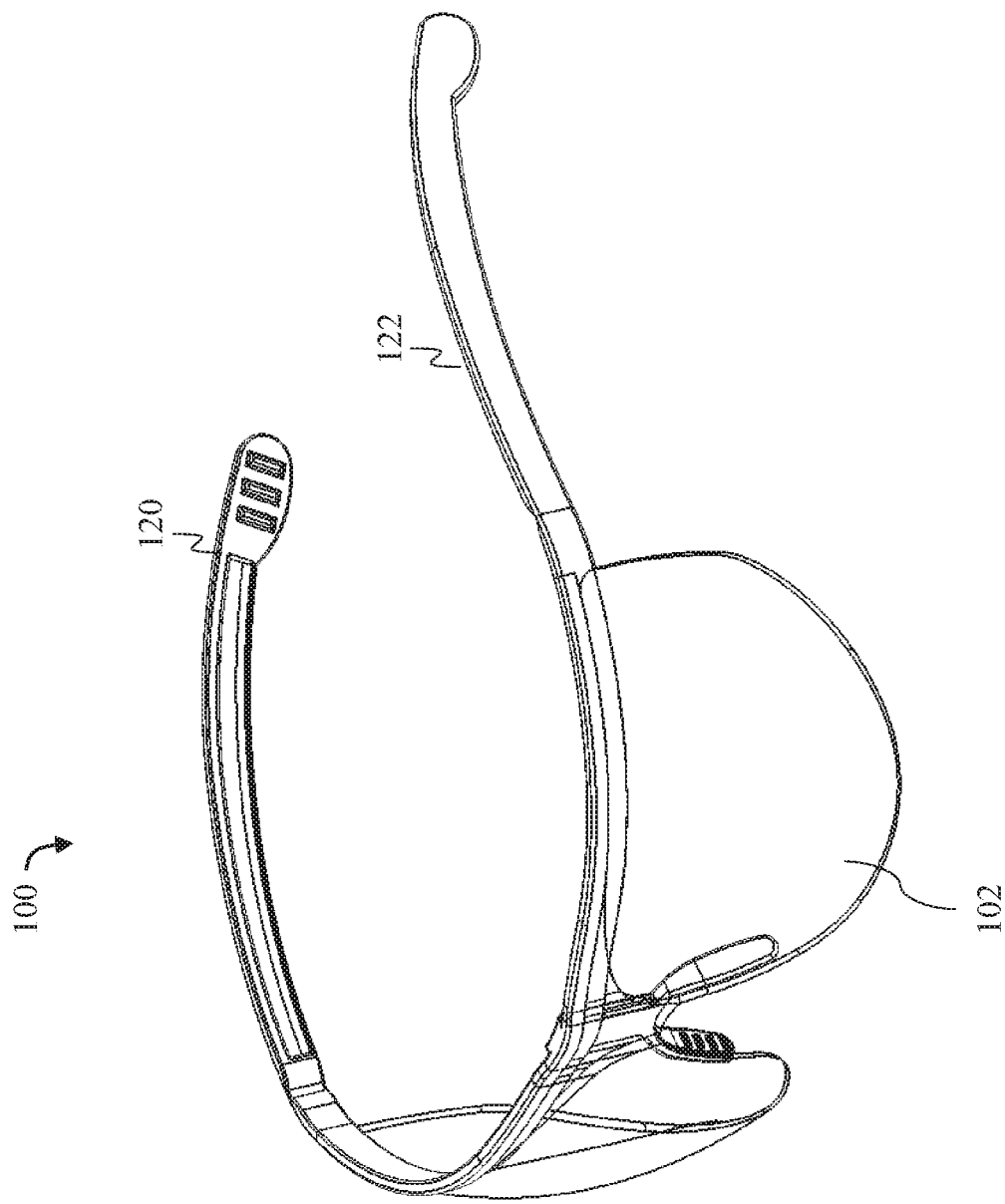
FIG. 2 depicts a top perspective view of the one-piece, composite eyewear article, according to an example embodiment.

FIG. 2 depicts a top perspective view of the one-piece, composite eyewear article 100, according to an example embodiment. FIG. 2 shows a better view of the contours of the left temple 122 and the lens 102.

Figure 3:
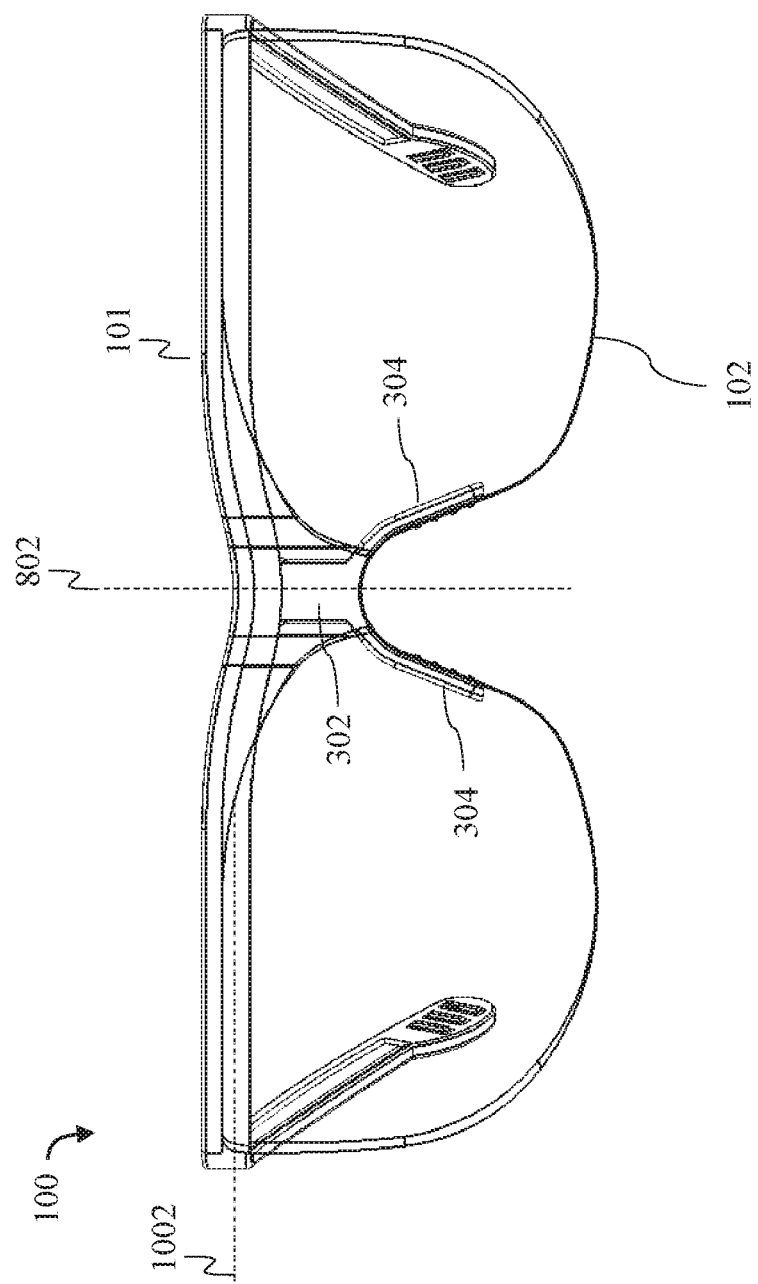
FIG. 3 depicts a front view of the one-piece, composite eyewear article, according to an example embodiment.

FIG. 3 depicts a front view of the one-piece, composite eyewear article 100, according to an example embodiment. FIG. 3 shows the location of the vertical cross section 802 taken on a plane perpendicular to the view of FIG. 3 and through the nosepiece 150. FIG. 3 also shows the location of the horizontal cross section 1002 taken on a plane perpendicular to the view of FIG. 3 and through the lens 102, wherein said plane is also perpendicular to the plan of the cross section 802.

Figure 4:
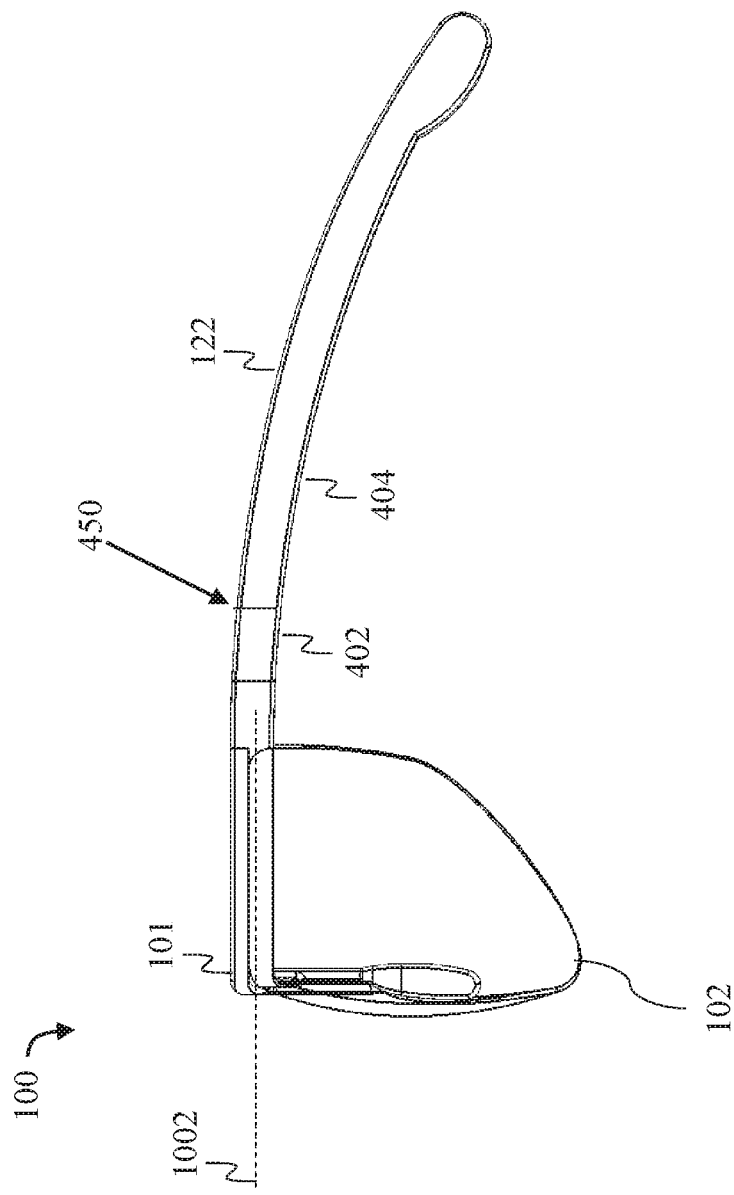
FIG. 4 depicts a left side view of the one-piece, composite eyewear article, according to an example embodiment.

FIG. 4 depicts a left side view of the one-piece, composite eyewear article 100, according to an example embodiment. FIG. 4 shows a better view of the contours of the left temple 122 and the curved nature of the lens 102. FIG. 3 also shows the location of the horizontal cross section 1002 taken on a plane perpendicular to the view of FIG. 3 and through the lens 102, wherein said plane is also perpendicular to the plan of the cross section 802.

FIG. 4 also shows the location of a possible vertical separation point 450 through the temple 122, which is described in greater detail below. In an alternative embodiment, the frame 101 is manufactured so as to include the top bar 110, hinges 130, 132 and temple stubs 402 (in lieu of entire temples 120, 122). In said alternative embodiment, temple arms 404 are manufactured or molded separately from the lens 102 and frame 101 and attached to the temple stubs 402 at a later time. When a temple arm 404 is removably coupled to a temple stub 402, at the separation point 450, FIG. 4 shows the temple arm 404 extending from the temple stub 402, as described more fully below. This feature allows purchasers of the article 100 to obtain interchangeable temple arms to change the color and design of the article 100 for fashion purposes, which increases the versatility of the article 100 for fashion purposes.

Figure 5:
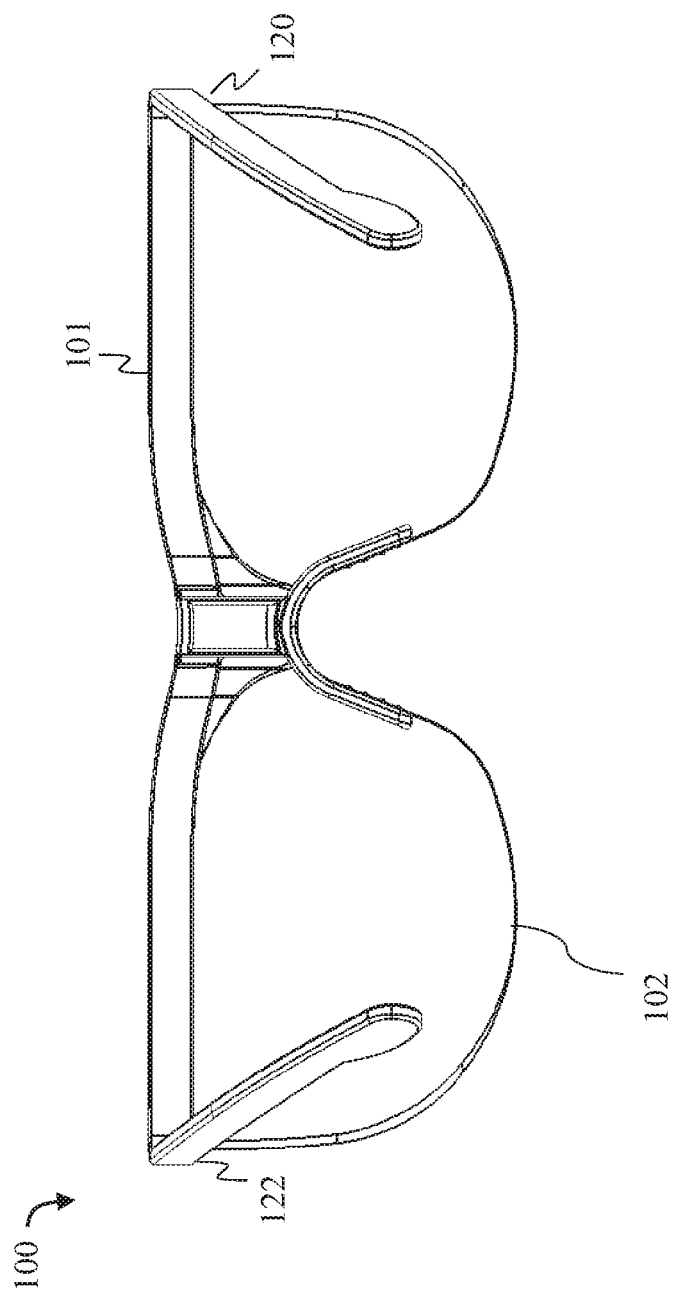
FIG. 5 depicts a rear view of the one-piece, composite eyewear article, according to an example embodiment.

FIG. 5 depicts a rear view of the one-piece, composite eyewear article 100, according to an example embodiment. FIG. 5 shows a better view of the contours of the top bar 110 and the nosepiece 150.

Figure 6:
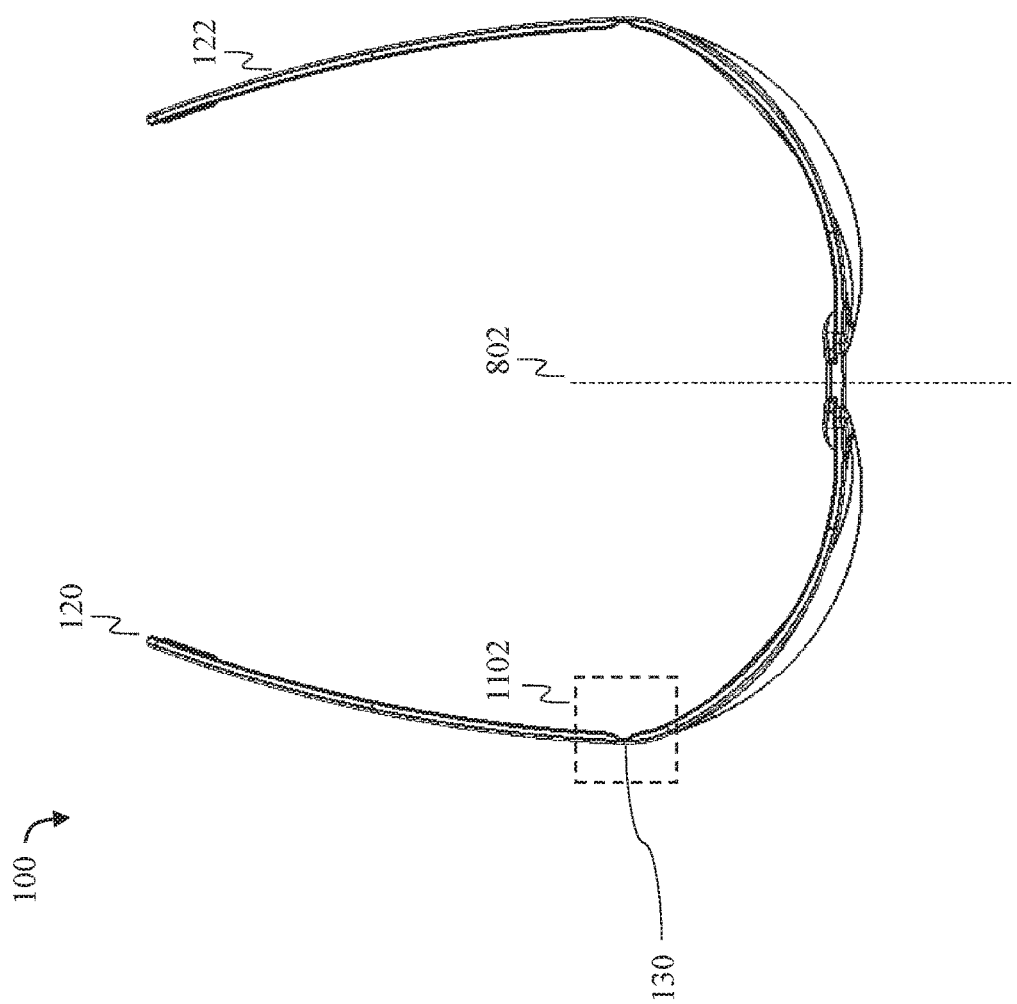
FIG. 6 depicts a top view of the one-piece, composite eyewear article, according to an example embodiment.
Figure 7:
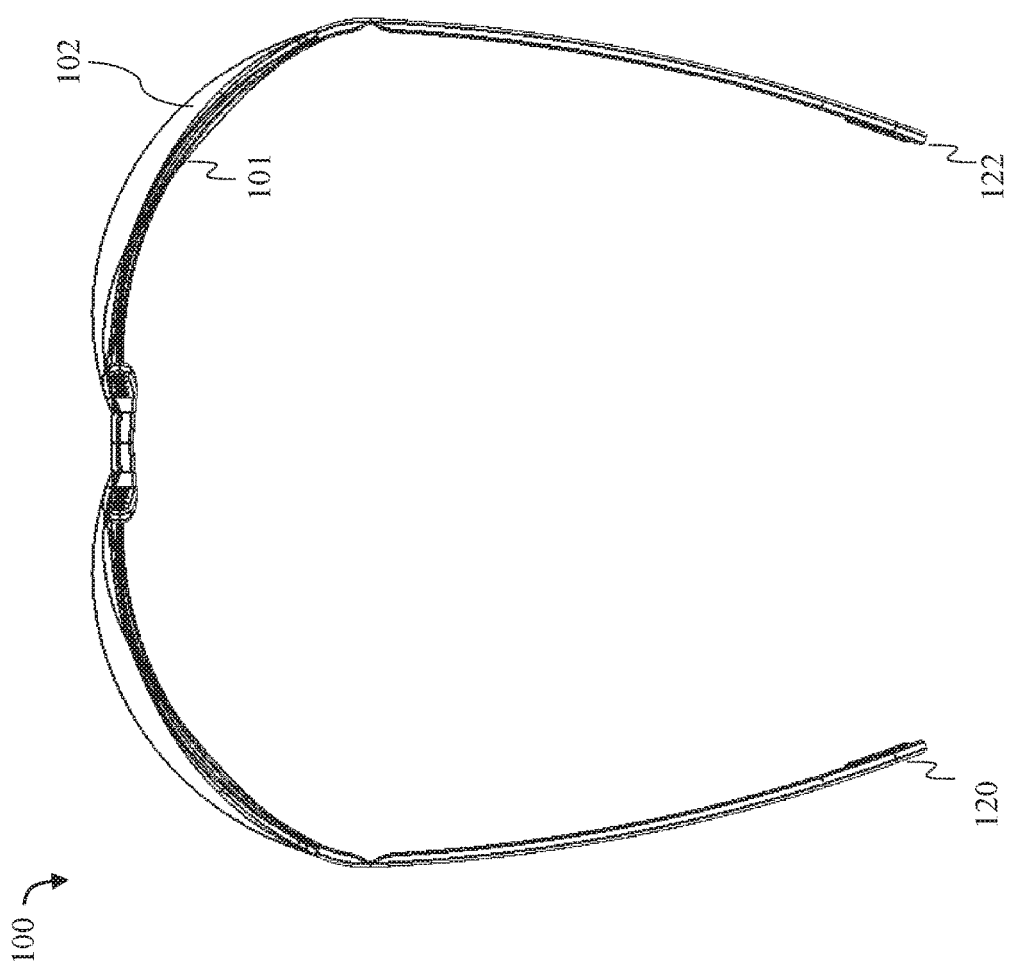
FIG. 7 depicts a bottom view of the one-piece, composite eyewear article, according to an example embodiment.

FIG. 6 depicts a top view of the one-piece, composite eyewear article 100, according to an example embodiment. FIG. 6 shows the location of the vertical cross section 802 taken on a plane perpendicular to the view of FIG. 6 and through the nosepiece 150. FIG. 6 further shows the close-up 1102 taken of the left hinge 130. FIG. 7 depicts a bottom view of the one-piece, composite eyewear article, according to an example embodiment.

Figure 8:
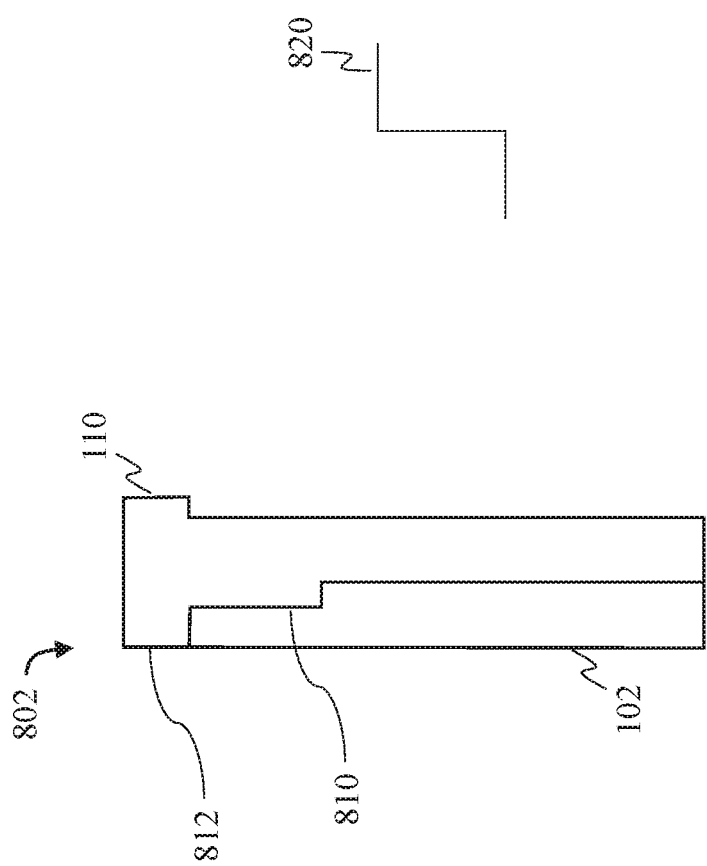
FIG. 8 depicts a cross sectional view of a midpoint of the one-piece, composite eyewear article, according to an example embodiment.

FIG. 8 depicts a cross sectional view 802 of the top bar 110 and lens 102 of the one-piece, composite eyewear article 100, according to an example embodiment. FIG. 8 shows that the cross section 802 depicts an approximate L-shaped element 810, wherein 810 is the top of the lens 102. Cross section 802 also depicts an approximate step shaped element representing the interior surface of the top bar 110 at the top end 812, into which the lens 102 is located. The step shape is depicted in shape 820, and comprises a vertical line connected at a top end to a first horizontal line that extends to the right, and the vertical line connected at a bottom end to a second horizontal line that extends to the left. The cross section 802 of the lens 102 is shown as having a step shape at the top end 810 (which matches the step shape of the top part 810 of the top bar 110).

Figure 10:
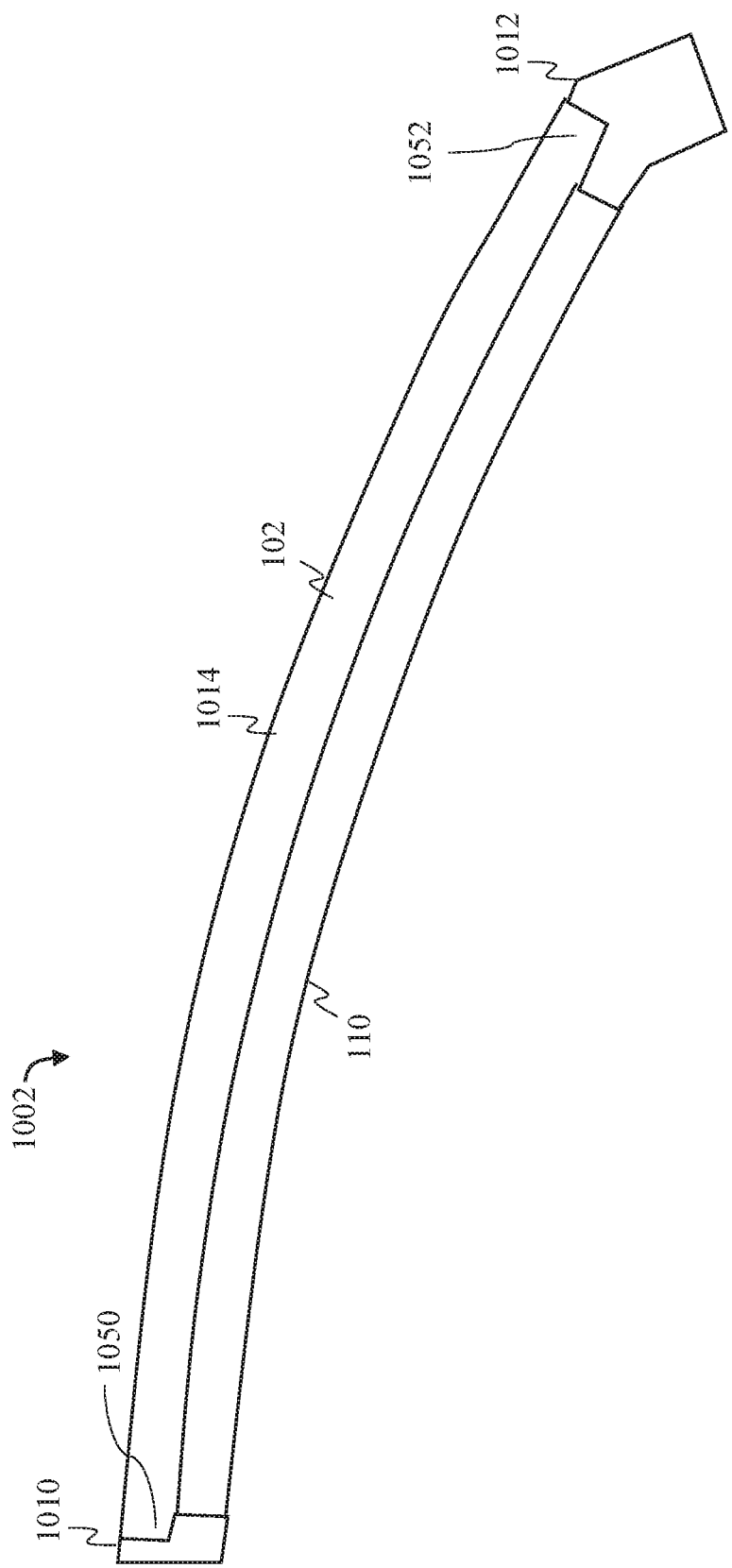
FIG. 10 depicts a cross sectional view of the top bar and lens of the one-piece, composite eyewear article, according to an example embodiment

FIG. 10 depicts a cross sectional view 1002 of the top bar 110 and lens 102 of the one-piece, composite eyewear article 100, according to an example embodiment. FIG. 10 shows that the cross section 1002 top bar 110 and lens 102 is shown as two approximate L-shaped elements 1010 and 1012, wherein 1010 is the interior or proximal part of top bar 110 and 1012 is the exterior or distal part of top bar 110. Cross section 1002 depicts an approximate step shaped element representing the interior surface of the top bar 110 at the proximal and distal elements 1010 and 1012, against which the lens 102 (or a portion thereof) is situated. During the manufacturing process, the lens 102 (or a portion thereof) auto-adheres to the step shaped elements of the interior surface of the top bar 110. A cross section of the lens 102 is shown as having a step shape at the proximal end 1050 (which matches the step shape of the proximal part 1010 of the top bar 110) and having a step shape at the distal end 1052 (which matches the step shape of the distal part 1012 of the top bar 110).

Note also that the lens 102 (or a portion thereof) contacts a forward-facing side of the planar piece 302 and pair of nose-pads 304 of the nosepiece 150. During the manufacturing process, the lens 102 (or a portion thereof) auto-adheres to the forward-facing side of the planar piece 302 and pair of nose-pads 304 of the nosepiece 150.

Figure 11:
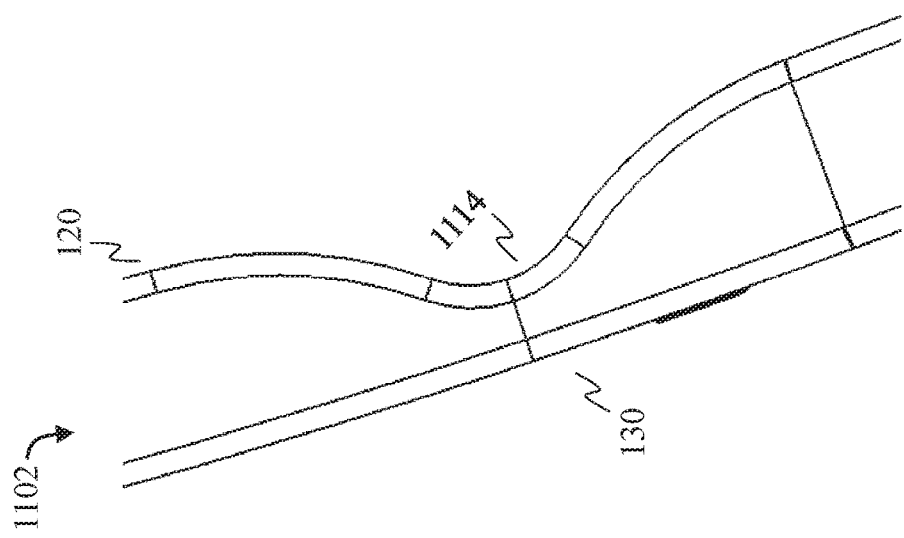
FIG. 11 depicts a top view of a hinge of the one-piece, composite eyewear article, according to an example embodiment.

FIG. 11 depicts a close-up 1102 of a top view taken of the right hinge 130 of the one-piece, composite eyewear article 100, according to an example embodiment. FIG. 11 shows that the right temple 120 has a uniform thickness that, as it approaches hinge 130, includes a détente or depression 114, which acts as a pivot point about which the temple 120 rotates.

FIG. 9A depicts a temple stub 402 and temple arm 404 including a protruding insert 906 that is configured for removable insertion into a complementing cavity (not shown) in the temple stub 402 (using a friction fit), so as to removably couple the temple arm with the temple stub. The complementing cavity in the temple stub 402 is a negative void that matches the shape and size of the protruding insert 906, such that the protruding insert fits securely within the complementing cavity, thereby removably coupling the temple stub 402 to the temple arm 404. The protruding insert 906 may be inserted into the complementing cavity in stub 402 using finger strength. FIG. 9B is a cross section of another connection point between a temple stub 402 and temple arm 404 including a protruding insert 913 that is configured for removable insertion into a complementing cavity 910 in the temple stub 402 (using a friction fit), so as to removably couple the temple arm with the temple stub.

Figure 9C:
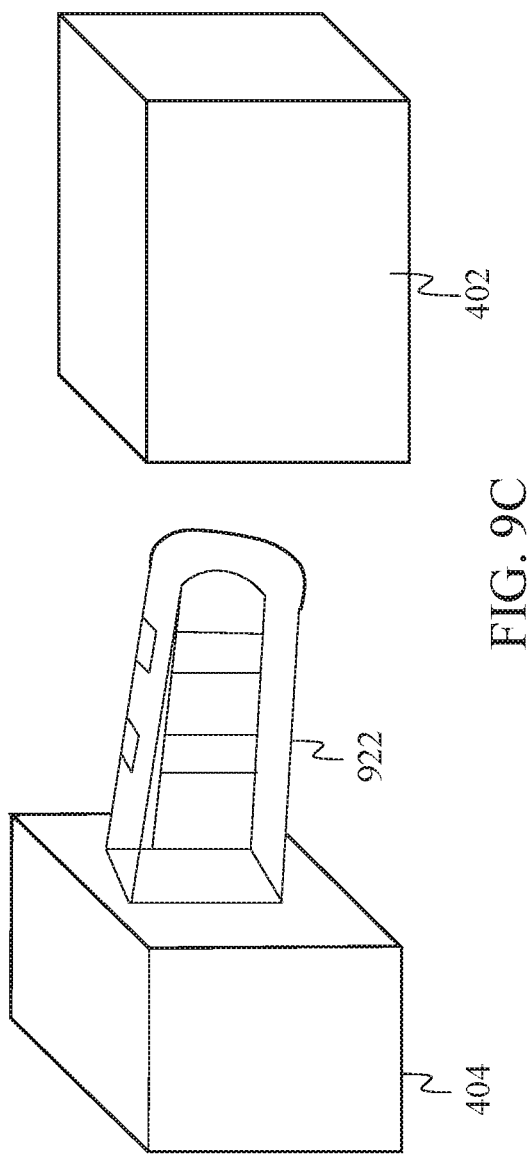
FIG. 9C depicts another temple stub and temple arm of a composite eyewear article, according to an example embodiment.
Figure 9D:
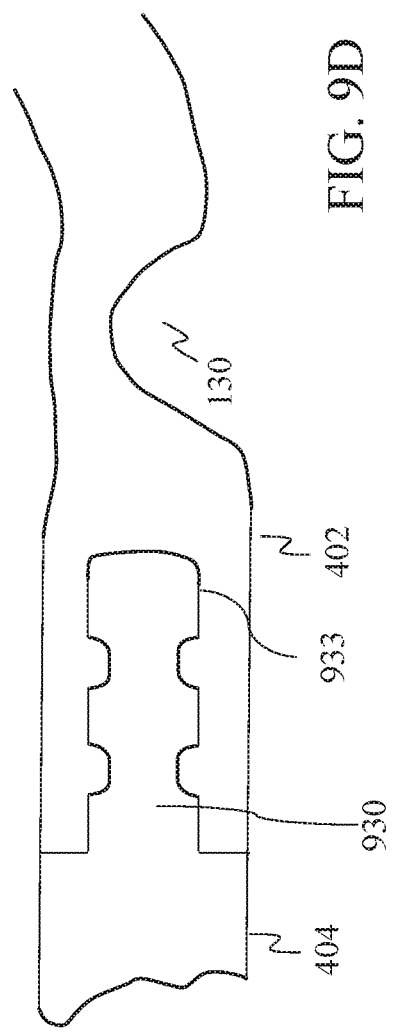
FIG. 9D depicts a cross sectional view of another temple stub and temple arm of a composite eyewear article, according to an example embodiment.

FIG. 9C depicts another temple stub 402 and temple arm 404 including a protruding insert 922 that is configured for removable insertion into a complementing cavity (not shown) in the temple stub 402 (using a friction fit), so as to removably couple the temple arm with the temple stub. FIG. 9D is a cross section of another connection point between a temple stub 402 and temple arm 404 including a protruding insert 930 that is configured for removable insertion into a complementing cavity 933 in the temple stub 402 (using a friction fit), so as to removably couple the temple arm with the temple stub.

In one embodiment, each temple arm 404 is composed of a single integral piece of solidified thermoplastic consisting of a polymer, as described herein. Each temple arm may be manufactured or molded separately from the frame 101 and/or the lens 102. In another embodiment, the frame 101 and/or the lens 102 are composed of cured liquid silicone rubber consisting of a dimethyl polysiloxane polymer thermoset, while each temple arm 404 is composed of a single integral piece of solidified thermoplastic consisting of a polymer.

Returning to manufacturing, the frame 101 and the lens 102 may be molded via a two-material molding process, such that the frame and the lens auto-adhere to each other during curing. Two material or multi-material injection molding is the process of molding two or more different materials into one part (or in one injection mold) at one time. As is the case in traditional injection molding, multi material injection molding uses materials that are at or near their melting point so that the semi-liquidous (viscous) material can fill voids and cavities within a pre-machined mold, thus taking on the desired shape of designed tooling. In general, advantages of multi-material injection molding over other production techniques include, but are not limited to, creating parts that have an elastic modulus that varies with location on the part (different regional polymer hardness), creating a single-structure part with different regional materials (similar to the previous advantage, but more focused on joining different types of polymers like rubber and plastic), and also creating a single part with multiple independent polymer colors. Injection molding of liquid silicone rubber is a process to produce pliable, durable parts.

An insert over molding process, which is a form of two-material molding processes, may be used. Insert molding involves molding material around a core or "insert". The insert in this case may be the frame, around which the lens is molded. Insert molding is often used to join the insert and secondary material together more securely than assembly allows. Moreover, it often eliminates post-molding assembly and saves the additional cost incurred in a secondary operation.

Injection molding consists of high-pressure injection of raw material into a mold which shapes the polymer into the desired shape. Molds can be of a single cavity or multiple cavities. In multiple cavity molds, each cavity can be identical and form the same parts or can be unique and form multiple different geometries during a single cycle. For thermosets, two different chemical components may be injected into the mold. These components immediately begin irreversible chemical reactions which eventually crosslinks the material into a single connected network of molecules. After the part has solidified, valves close to isolate the injection system and chemical precursors, and the mold opens to eject the molded part(s). Then, the mold closes and the process repeats.

In one embodiment, any of the components of the composite eyewear article described above may comprise other materials, such as any thermoset elastomer, any plastic, polyethylene, PVC, or the like. In another embodiment, the frame 101 and/or lens 102 is tinted with any one of: carbon nano tint, soluble organic dye, metallic oxide pigments or any dye known in the art for use with thermoset elastomers. A thermoset is a material that is irreversibly cured from a soft solid or viscous liquid prepolymer or resin. The process of curing changes the resin into an infusible, insoluble polymer network, and is induced by the action of heat or suitable radiation often under high pressure, or by mixing with a catalyst. Thermoset resins are usually malleable or liquid prior to curing and are often designed to be molded into their final shape.

In one embodiment, the entire frame 101 is composed of a single integral piece of cured thermoplastic consisting of a liquid polymer. A thermoplastic, or thermosoftening plastic, is a plastic polymer material that becomes pliable or moldable at a certain elevated temperature and solidifies upon cooling. Examples of a thermoplastic include acrylic, acrylonitrile butadiene styrene, nylon, PLA, polybenzimidazole, polycarbonate, polyether sulfone, polyoxymethylene, polyetherether ketone, polyetherimide, polyethylene, polyphenylene oxide, polyphenylene sulfide, polypropylene, polystyrene, polyvinyl chloride, polyvinylidene fluoride, and Teflon. In another embodiment, the entire frame 101 is composed of a single integral piece of cured liquid silicone rubber consisting of a liquid dimethyl polysiloxane polymer thermoset.

Similarly, in one embodiment, the entire lens 102 is composed of a single integral piece of optical grade cured liquid silicone rubber consisting of a liquid dimethyl polysiloxane polymer thermoset. The term "single, integral piece" refers to one piece or part that is formed of a continuous volume of a polymer material that is injected all at once, and that cures all at once. For example, the lens 102 may be a single, integral piece of optical grade cured liquid silicone rubber that is injected into a mold all at once, and that cures all at once. In yet another embodiment, in lieu of a single lens 102, the article 100 may comprise two separate lenses.

The one-piece, composite eyewear article 100 may be prepared by a two-material molding process comprising the steps of providing a mold having: 1) a first void defining an eyewear frame 101 comprising of two temples 120, 122 (or two temple stubs), a top bar 110, a nosepiece 150 and two hinges 130, 132, and 2) a second void defining a lens 102 situated against the top bar and extending across the top bar. The process continues by injecting the first void in the mold with a thermoplastic consisting of a liquid polymer, so as to produce said frame as a single integral piece and injecting the second void in the mold with optical grade liquid silicone rubber consisting of a dimethyl polysiloxane polymer thermoset, so as to produce said lens as a single integral piece. The process continues by allowing a predefined period of time to pass, wherein during said period of time, the lens auto-adheres to the frame during curing. Thereafter, the one-piece, composite eyewear article is removed from the mold. In parallel to the manufacturing of the frame and lens above, in one embodiment, temple arms 404 are manufactured or molded separately from the lens 102 and frame 101 and removably attached to the temple stubs 402 at a later time. The temple arms may be composed of a solidified thermoplastic consisting of a polymer, wherein said temple arms may be injection molded similarly to the frame 101 above. In one alternative to the process described above, the first void in the mold is injected with a liquid silicone rubber consisting of a dimethyl polysiloxane polymer thermoset (instead of a thermoplastic consisting of a liquid polymer), so as to produce said frame as a single integral piece.

The term "auto-adhere" refers to the process by which a first material in a liquid or semi-liquid state cures or cools down into a solid or near solid state while contacting a second material, wherein the first material adheres to, or forms a bond with, the second material. The second material may also be in a liquid or semi-liquid state, and the second material may cure or cool down into a solid or near solid state while contacting the first material.

Liquid dimethyl polysiloxane polymer thermoset belongs to a group of polymeric organosilicon compounds that are commonly referred to as silicones. It is the most widely used silicon-based organic polymer and is particularly known for its unusual rheological (or flow) properties. It is optically clear, and, in general, inert, non-toxic, and non-flammable.

Embodiments may be described above with reference to functions or acts, which comprise methods. The functions/acts noted above may occur out of the order as shown or described. For example, two functions/acts shown or described in succession may in fact be executed substantially concurrently or the functions/acts may sometimes be executed in the reverse order, depending upon the functionality/acts involved. While certain embodiments have been described, other embodiments may exist. Further, the disclosed methods' functions/acts may be modified in any manner, including by reordering functions/acts and/or inserting or deleting functions/acts, without departing from the spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A one-piece, composite eyewear article, comprising:
   a) an eyewear frame comprising of two temples, a top bar and two hinges, the entire frame composed of a single integral piece of solidified thermoplastic consisting of a polymer;
   b) a lens situated against, and extending across, the top bar, the lens composed of a single integral piece of optical grade cured liquid silicone rubber consisting of a dimethyl polysiloxane polymer thermoset; and
   c) wherein the frame and lens are molded via a two-material molding process, such that the lens auto-adheres to the frame during curing.

2. The one-piece, composite eyewear article of claim 1, wherein a first temple of the two temples is coupled with the top bar via a first hinge of the two hinges, a second temple of the two temples is coupled with the top bar via a second hinge of the two hinges, and a nosepiece is coupled to a midpoint of the top bar.

3. The one-piece, composite eyewear article of claim 2, wherein an interior surface of the top bar comprises a step shape.

4. The one-piece, composite eyewear article of claim 3, wherein a first portion of the lens contacts the step shape of the interior surface of the top bar.

5. The one-piece, composite eyewear article of claim 4, wherein the first portion of the lens auto-adheres to the step shape of the interior surface of the top bar.

6. The one-piece, composite eyewear article of claim 5, wherein the nosepiece comprises a planar piece extending downwards, and a pair of nose-pads coupled to the planar piece.

7. The one-piece, composite eyewear article of claim 6, wherein a second portion of the lens contacts a forward-facing side of the planar piece and pair of nose-pads.

8. The one-piece, composite eyewear article of claim 7, wherein the second portion of the lens auto-adheres to the forward-facing side of the planar piece and pair of nose-pads.

9. The one-piece, composite eyewear article of claim 8, wherein the first hinge comprises a first détente in the first temple and the second hinge comprises a second détente in the second temple.

10. The one-piece, composite eyewear article of claim 9, wherein the first détente is configured to allow the first temple to rotate about the first hinge, and wherein the second détente is configured to allow the second temple to rotate about the second hinge.

11. The one-piece, composite eyewear article of claim 10, wherein the frame is tinted with any one of: carbon nano tint, soluble organic dye and metallic oxide pigments.

12. The one-piece, composite eyewear article of claim 11, wherein the lens is tinted with any one of: carbon nano tint, soluble organic dye and metallic oxide pigments.

13. A composite eyewear article, comprising:
   a) an eyewear frame comprising of two temple stubs, a top bar, a nosepiece and two hinges, the entire frame composed of a single integral piece of solidified thermoplastic consisting of a polymer;
   b) a lens situated against, and extending across, the top bar, the lens composed of a single integral piece of optical grade cured liquid silicone rubber consisting of a dimethyl polysiloxane polymer thermoset;
   c) wherein the frame and lens are molded via a two-material molding process, such that the lens auto-adheres to the frame during curing; and
   d) a pair of separately molded temple arms configured for removable coupling with the two temple stubs.

14. The composite eyewear article of claim 13, wherein a first temple stub of the two temple stubs is coupled with the top bar via a first hinge of the two hinges, a second temple stub of the two temple stubs is coupled with the top bar via a second hinge of the two hinges.

15. The one-piece, composite eyewear article of claim 14, wherein the first hinge comprises a first détente in the first temple stub and the second hinge comprises a second détente in the second temple stub.

16. The one-piece, composite eyewear article of claim 15, wherein the first détente is configured to allow the first temple stub to rotate about the first hinge, and wherein the second détente is configured to allow the second temple stub to rotate about the second hinge.

17. The one-piece, composite eyewear article of claim 16, wherein the frame is tinted with any one of: carbon nano tint, soluble organic dye and metallic oxide pigments.

18. The one-piece, composite eyewear article of claim 17, wherein the lens is tinted with any one of: carbon nano tint, soluble organic dye and metallic oxide pigments.

19. A one-piece, composite eyewear article, the article prepared by a process comprising the steps of:
   a) providing a mold having a first void defining an eyewear frame comprising of two temple stubs, a top bar and two hinges, and a second void defining a lens situated against the top bar and extending across the top bar;
b) injecting the first void in the mold with a thermoplastic consisting of a liquid polymer, so as to produce said frame as a single integral piece;
c) injecting the second void in the mold with optical grade silicone rubber consisting of a liquid dimethyl polysiloxane polymer thermoset, so as to produce said lens as a single integral piece;
d) allowing a predefined period of time to pass, wherein during said period of time, the lens auto-adheres to the frame during curing; and
e) removing the one-piece, composite eyewear article from the mold.

20. A composite eyewear article, comprising:
a) an eyewear frame comprising of two temple stubs, a top bar, a nosepiece and two hinges, the entire frame composed of a single integral piece of cured liquid silicone rubber consisting of a dimethyl polysiloxane polymer thermoset;
b) a lens situated against, and extending across, the top bar, the lens composed of a single integral piece of optical grade cured liquid silicone rubber consisting of a dimethyl polysiloxane polymer thermoset;
c) wherein the frame and lens are molded via a two-material molding process, such that the lens auto-adheres to the frame during curing; and
d) a pair of temple arms configured for removable coupling with the two temple stubs, each temple arm composed of a single integral piece of solidified thermoplastic consisting of a polymer.

* * * * *